(12) United States Patent
Chang

(10) Patent No.: US 6,742,237 B2
(45) Date of Patent: Jun. 1, 2004

(54) METHOD OF MAKING A HEAT-STAMPED METALLIC ARTIFICIAL NAIL

(75) Inventor: Sung Yong Chang, Roslyn Heights, NY (US)

(73) Assignee: KMC Exim Corp., Port Washington, NY (US)

( * ) Notice: Subject to any disclaimer, the term of this patent is extended or adjusted under 35 U.S.C. 154(b) by 135 days.

(21) Appl. No.: 10/144,371

(22) Filed: May 13, 2002

(65) Prior Publication Data

US 2003/0208895 A1 Nov. 13, 2003

(51) Int. Cl.[7] ............................................... B21D 35/00
(52) U.S. Cl. .......................... 29/469.5; 132/73; 156/61
(58) Field of Search ........................ 29/469.5, 896.41; 132/73; 156/61, 251, 297; 428/15

(56) References Cited

U.S. PATENT DOCUMENTS

| | | |
|---|---|---|
| 2,749,640 A | 6/1956 | Scott |
| 2,816,555 A | 12/1957 | Klump |
| 2,864,384 A | 12/1958 | Walter |
| 3,502,088 A * | 3/1970 | Sven ............................ 132/73 |
| 3,584,572 A | 6/1971 | Apicella |
| 3,629,304 A | 12/1971 | Kuroda |
| 4,581,088 A | 4/1986 | House |
| 4,718,957 A | 1/1988 | Sensenbrenner |
| 4,898,192 A * | 2/1990 | Cohen ........................ 132/73 |
| 4,920,991 A * | 5/1990 | Shibahashi et al. ........... 132/73 |
| 4,974,610 A * | 12/1990 | Orsini .......................... 132/73 |
| 5,622,587 A * | 4/1997 | Barthelman ................. 156/251 |
| 5,699,813 A * | 12/1997 | Carroll ......................... 132/73 |
| 5,778,900 A * | 7/1998 | Bate ............................. 132/73 |
| 5,928,457 A * | 7/1999 | Engler ......................... 156/61 |
| 6,296,836 B1 | 10/2001 | Engler |
| 6,516,813 B2 * | 2/2003 | Yiu .............................. 132/73 |

FOREIGN PATENT DOCUMENTS

FR    1 006 271    4/1952

* cited by examiner

*Primary Examiner*—David P. Bryant
(74) *Attorney, Agent, or Firm*—Hoffmann & Baron, LLP

(57) ABSTRACT

A method for manufacturing a metallic artificial nail for attachment to a natural nail includes the step of heat-stamping a metallic substrate having a heat-activatable layer to a surface of a contoured nail body whereby the metallic substrate is bonded to the nail body. Also provided is a die set for heat-stamping a metallic substrate onto a contoured nail body to form a metallic artificial nail which includes a die including a first contoured surface substantially corresponding to the contour of a bottom surface of the nail body for supporting the nail body in the die set and a punch including a second contoured surface positioned opposite the first contoured surface. The second contoured surface substantially corresponds to the contour of a top surface of the nail body for conforming the metallic substrate to the contour of the top surface of the nail body during heat-stamping.

20 Claims, 4 Drawing Sheets

METHOD OF MAKING A HEAT-STAMPED METALLIC ARTIFICIAL NAIL

BACKGROUND OF THE INVENTION

The present invention relates generally to artificial nails that are applied to natural nails with an adhesive, and more particularly to an artificial nail having a heat-stamped outer metallic layer and its method of manufacture.

Artificial nails have been used for many years to enhance the cosmetic appearance of the fingers. Some individuals opt to use artificial nails because their own nails are too weak to grow to a desirable length without breaking. Others choose artificial nails because they are considerably stronger and more durable than natural nails, and because nail polish adheres better to the artificial nail surface. Some individuals are unhappy with the shape and contour of their natural nail and opt to use an artificial nail to improve the appearance of their nails.

It has been known in the art of adorning the hands to provide ornamental fingernail accessories made from thin, molded plastic members manufactured generally in the shape of a fingernail. Indeed, numerous artificial fingernail manufacturers have provided a variety of combinations of materials, arrangements, and colors in fingernail accessories. With the advent of such artificial fingernail accessories, the wearer could now have intricately pre-designed fingernails that are simply attached to the natural fingernail and then later easily removed.

Conventional pre-designed fingernails include a decorative design stenciled or air-brushed on a top surface thereof. The pre-designed artificial nail is glued to the surface of the natural nail by applying an amount of a liquid bonding adhesive to the bottom surface of the artificial nail and/or the top surface of the natural nail to affix the accessory to the nail. Usually the wearer must wipe or trim away any excess adhesive and then wait several moments until the adhesive dries to ensure that the accessory is secured to the nail. An overlay is then typically applied to the entire top surface of the artificial nail. The overlay is usually transparent or translucent so that the decorative design is visible on the top surface of the artificial nail. Once the overlay sets, the artificial nail is shaped as desired.

Of the myriad possible designs given to artificial nails, a particularly attractive ornamentation is to provide the artificial nail with a metallic look, whereby the nail appears to be made from a metallic material. Typically, this ornamentation is provided by painting or otherwise applying a polish having a metallic appearance directly on an artificial nail. This may be done by the consumer or it may be pre-applied prior to sale to the consumer. In either event, this procedure can be expensive, messy and time consuming. Additionally, nail polish typically chips and peels, eventually requiring reapplication whether on natural or artificial nails.

It is known from U.S. Pat. No. 6,296,836 to provide a nail with a metallic leafing material layer adhered to the nail to achieve the metallic look. However, this ornamentation is accomplished by first applying an adhesive coating to the top surface of the nail with a brush, adhering a thin sheet of metallic material having an area larger than the nail over the adhesive coating, smoothing the material with a brush to eliminate creases and wrinkles and trimming the excess material that extends beyond the periphery of the nail. Finally, a coating of clear polish or other sealer is applied over the sheet material to maintain the decorated nail's durability. While the desired ornamentation is achieved, the process is again messy and time consuming and requires an amount of skill to achieve satisfactory results.

Accordingly, it is an object of the present invention to provide an ornamental artificial nail having a pre-applied decorative metallic appearance which is simply and inexpensively manufactured.

SUMMARY OF THE INVENTION

The present invention is a method and a die set for manufacturing a metallic artificial nail for attachment to a natural nail. "Artificial nail", as used herein also includes fingernail extensions, referred to in the trade as "tips", which will be more fully explained hereinbelow.

The method includes the step of heat-stamping a metallic substrate having a heat-activatable layer to a surface of a contoured nail body whereby the metallic substrate is bonded to the nail body. Preferably, the step of heat-stamping includes the steps of placing the nail body in a heat-stamping press die set, placing the metallic substrate in the die set such that the heat-activatable layer faces the top surface of the nail body, closing the die set so that the heat-activatable layer makes contact with the top surface of the nail body and heating the die set to cause the heat-activatable layer to bond to the top surface of the nail body. The method further preferably includes the step of coating the metallic substrate with a clear sealant.

In the preferred embodiment of the present invention, the heat-stamping press die set includes a first contoured surface substantially corresponding to the contour of the bottom surface of the nail body for supporting the bottom surface of the nail body when the die set is closed. Similarly, the heat-stamping press die set preferably includes a second contoured surface substantially corresponding to the contour of the top surface of the nail body. The second contoured surface of the die set faces the top surface of the nail body when the die set is closed. A cutting edge surrounding the second contoured surface may be provided for cutting the metallic substrate around the periphery of the nail body as the die set is closed.

As the die set is closed, the second contoured surface of the die set bears against the metallic substrate causing the substrate to stretch and conform to the top surface of the nail body. Additionally, the peripheral edges of the cut metallic substrate adhere to the peripheral edge of the nail body and become beveled during cutting.

The metallic substrate is preferably made from a metal selected form the group consisting of aluminum, silver, copper and gold. It may be placed over the entire top surface of the nail body or it may be placed over only a portion of the top surface of the nail body.

Preferably, the nail body is a one-piece injection molded body made from a transparent material. The metallic nail may be a full cover, wherein the proximal end of the nail body is sized and shaped to substantially correspond to the full nail bed of the natural nail, or the nail may be a nail tip, wherein the proximal end of the nail body is sized and shaped to be attachable to only the distal end of the natural nail.

The method for manufacturing a metallic artificial nail according to the present invention preferably includes the step of stretching the metallic substrate over the contoured nail body prior to heat-stamping. In particular, a nail body is placed in the heat-stamping press die set and a metallic substrate is positioned over the nail body such that the heat-activatable layer of the substrate faces the top surface of the nail body. The metallic substrate is engaged on opposite sides of the nail body with stretching rollers, which press the metallic substrate onto the nail body to stretch the metallic substrate over the contoured nail body prior to heat-stamping.

A die set for heat-stamping a metallic substrate onto a contoured nail body to form a metallic artificial nail is also provided as a result of the present invention. The die set generally includes a die including a first contoured surface substantially corresponding to the contour of a bottom surface of the nail body for supporting the nail body in the die set and a punch including a second contoured surface positioned opposite the first contoured surface. The second contoured surface substantially corresponds to the contour of a top surface of the nail body for conforming the metallic substrate to the contour of the top surface of the nail body during heat-stamping.

The punch is preferably provided on a top die shoe and may further include a cutting edge surrounding the second contoured surface for cutting the metallic substrate around the periphery of the nail body during heat-stamping. The die is preferably provided on a bottom die shoe which faces the first die shoe. The die set further preferably includes stretching rollers positioned on opposite sides of the punch for stretching the metallic substrate onto the contoured nail body prior to heat-stamping.

As a result of the present invention, an artificial nail having a decorative metallic appearance is provided. The method for manufacturing the nail is simple, cost effective and does not require the messy separate application of adhesive or the smoothing or trimming of the metallic sheet material. The result is an inexpensive cosmetically appealing artificial nail having a pre-applied metallic appearance.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENT

Figure 1:
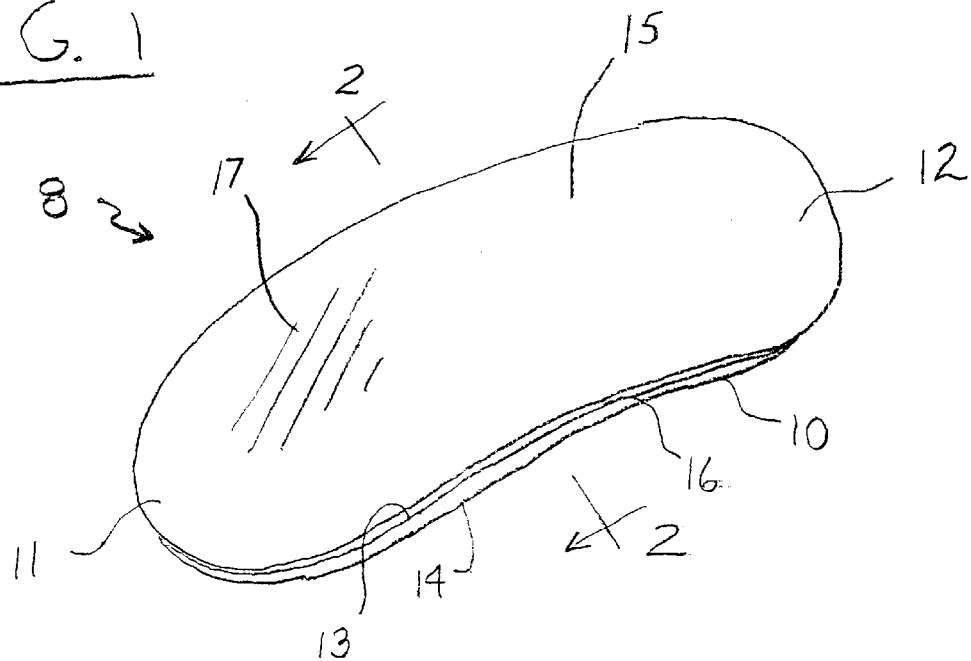
FIG. 1 is a perspective view of the metallic artificial nail formed in accordance with the present invention.
Figure 2:
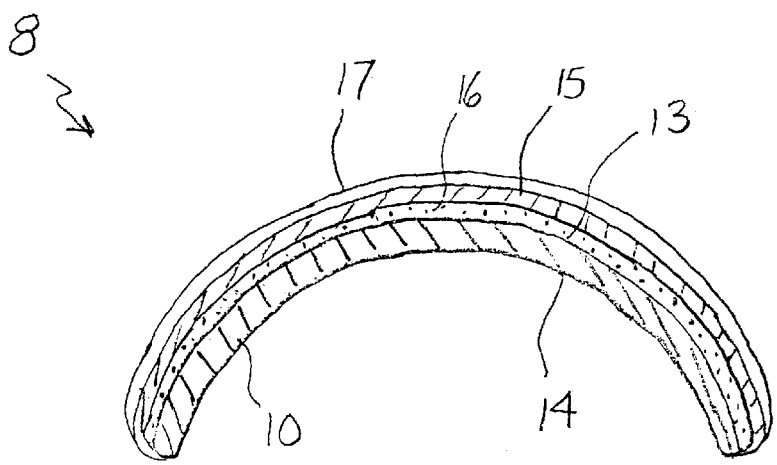
FIG. 2 is a cross-sectional view of the nail shown in FIG. 1 taken along the line 2—2.

Referring first to FIGS. 1 and 2, a metallic artificial nail 8 formed in accordance with the present invention is shown. The metallic artificial nail 8 preferably includes a one-piece molded body 10 having a distal end 11, a proximal end 12, a top surface 13 and a bottom surface 14. The proximal end 12 and, more particularly, the bottom surface 14 adjacent the proximal end 12 is sized and shaped to be attachable to the top surface of a natural nail. Preferably, the distal end 11 is sized to extend beyond the end of the natural nail when the artificial nail is attached to the natural nail.

The nail body 10 is preferably injection molded from a plastic material such as ABS plastic, and is generally rectangular in shape. The plastic material can be transparent or opaque. The distal end 11 can be rounded as shown in FIG. 1 or it can be straight. The artificial nail is not limited to any particular dimensions. In other words, the artificial nail of the present invention is useful for fingernails and/or toenails and can be made in a variety of sizes and shapes. For instance, the proximal end 12 of the nail body 10 may substantially correspond in size and shape to the full nail bed of a natural fingernail, whereby the artificial nail is termed a full nail cover that is applied over the full nail bed of a natural fingernail. Alternatively, the proximal end 12 may be attachable to only the distal end of a natural fingernail, that is, for example, it may correspond in size and shape to only the distal end of the natural nail bed, whereby the artificial nail is termed a nail tip that is applied to the end of the natural fingernail.

Bonded to the top surface 13 of the nail body 10 is a metallic substrate 15. As will be discussed in further detail below, the metallic substrate 15 is a thin sheet of metallic material 15 having a heat-activatable layer 16 for permanently bonding the metallic material to the nail body 10. The thin sheet of metallic material can be aluminum, silver, copper, gold or other metallic leafing material and the heat activatable layer 16 can be a heat-activated adhesive. Such material is supplied by Admiral Coated Products under part numbers such as ALUM-W718D or GOLD-W127Y. Upon its application to the nail body 10, the metallic substrate 15 creates a smooth shiny appearance that additionally adds strength to the nail and does not crack or chip easily. As shown in FIG. 1, the metallic substrate 15 is applied over the entire top surface 13 of the nail body 10. However, it may be applied over only a portion thereof, as desired. Additionally, one or more coatings of a clear polish 17 or other sealer may be applied over the metallic substrate 15 to maintain the decorated nail's durability.

Figure 3:
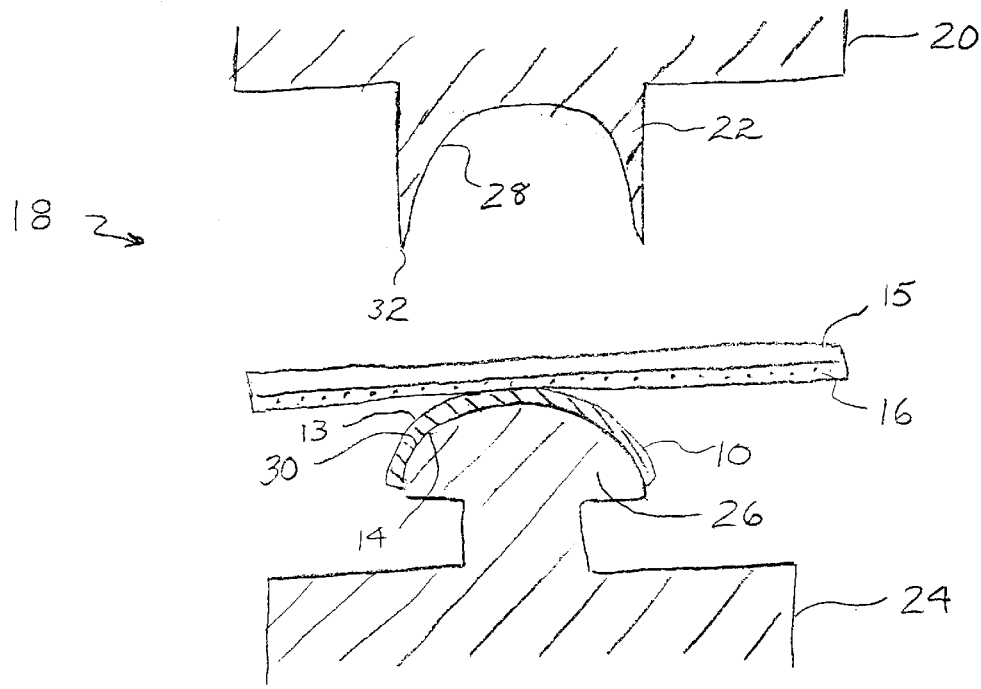
FIG. 3 is a cross-sectional view of a die set used for forming the metallic artificial nail in accordance with the present invention in its open position.
Figure 4:
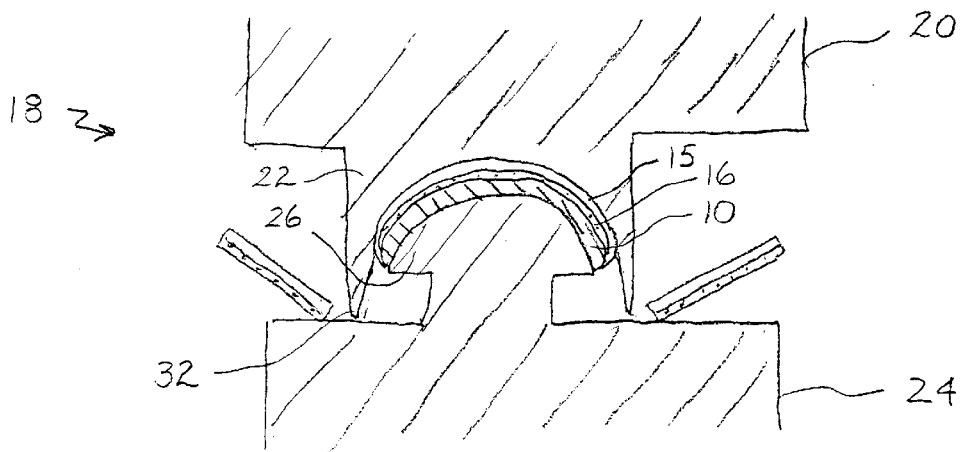
FIG. 4 is a cross-sectional view of the die set shown in FIG. 3 in its closed position.

Referring now to FIGS. 3 and 4, the metallic artificial nail is formed according to the present invention in a heat-stamping press having a die set 18 configured to permanently bond the metallic substrate 15 to the nail body. The die set 18 includes a top die shoe 20 having a punch 22 and a bottom die shoe 24 having a die 26. In the preferred embodiment, the punch 22 includes a contoured surface 28 that corresponds to both the longitudinal and lateral contour of the top surface 13 of the nail body 10. Similarly, the die 26 preferably includes a contoured surface 30 that corresponds to both the longitudinal and lateral contour of the bottom surface 14 of the nail body 10. The contoured surface 28 of the punch 22 can be bounded by a cutting edge 32, which, as will be discussed in further detail below, trims the excess material of the thin metallic substrate 15 that extends beyond the periphery of the nail body 10. Preferably, the cutting edge 32 closely corresponds to the periphery of the nail body 10.

The die set 18 is arranged so that the contoured surface 28 of the punch 22 is aligned and mates with the contoured surface 30 of the die 26 when the heat-stamping press is closed as shown in FIG. 4. Only one die set 18 is shown in FIGS. 3 and 4, however, as will be discussed in further detail below, an arrangement of multiple die sets can be used in the heat-stamping press for simultaneously forming a plurality of metallic artificial nails. Additionally, the means for heating the die set 18 is not shown in FIGS. 3 and 4, however, as is typical in heat-stamping presses of this type, the top and bottom die shoes 20 and 24, include heating elements which raise the temperature of the die set, typically to about 500° F.

In operation, a nail body 10 is first positioned on the contoured surface 30 of the die 26. The metallic substrate 15 is positioned on top of the nail body 10 so that the heat-activatable layer 16 faces the top surface 13 of the nail body. The heated top and bottom die shoes 20 and 24 are then brought together so that the contoured surface 28 of the top die shoe punch 22 bears upon the metallic substrate 15 and causes it to stretch as it conforms to the contoured surface. This stretching results in a smooth wrinkle-free appearance to the final product. Since the die set 18 is heated, the heat-activatable layer 16 reacts to the heat and bonds to the top surface 13 of the nail body as the press closes further. Upon closure of the die set 18, the cutting edge 32 cuts the metallic substrate 15 around the periphery of the nail body 10. As the metallic substrate 15 is cut, the heat-activatable layer 16 causes the peripheral edges of the metallic substrate to adhere to the peripheral edge of the nail body 10. In other words, the peripheral edge of the metallic substrate 15 will be beveled as a result of being heat-cut by the cutting edge 32. The manufacturing process is completed by opening the die set 18 and removing the completed metallic artificial nail 8 from the press. As mentioned above, the nail 8 can further be coated with a clear sealant to provide added durability.

Referring now to FIGS. 5–8, a preferred form of a die set 34 is shown. The die set 34 shown in FIGS. 5–8 includes a plurality of punches 36 on the top die shoe 38 and a plurality of mating dies 40 on the bottom die shoe 42. Three punches 36 with three respective dies 40 are shown in FIGS. 5–8, however, a total of ten punches and dies is preferred to simultaneously heat-stamp a fall set of ten metallic artificial nails corresponding in size to each finger of both hands. The die set 34 shown in FIGS. 5–8 further preferably includes stretching rollers 44 positioned on both sides of each of the punches 36 and dies 40. The stretching rollers 44 are cylindrical rods having a length at least as long as the nail bodies 10 and a curved peripheral surface to prevent damage to the metallic substrate 46. The stretching rollers 44 can be mechanically connected to the top die shoe 38, but are designed to move vertically independent of the top die shoe. As will be discussed below, the purpose of the stretching rollers 44 is to initially pre-stretch the metallic substrate 46 over the contour of the nail body 10 prior to actual heat-stamping.

The preferred die set 34 shown in FIGS. 5–8 further includes a metallic substrate feed system having a feed spool 48 and a waste spool 50. Unlike the metallic substrate 15 described above, the metallic substrate 46 used with the preferred die set 34 shown in FIGS. 5–8 is releasably carried on a backing layer 52 disposed opposite the heat-activatable layer 54. The feed spool 48 supports the metallic substrate 46 in roll form and continuously supplies the substrate to the die set 34 such that the backing layer faces the punches 36 and the heat-activatable layer 54 faces the dies 40. The metallic substrate 46 is incrementally fed through the die set 34 so that prior to each heat-stamping, there is metallic substrate material positioned above each nail body 10.

Figure 5:
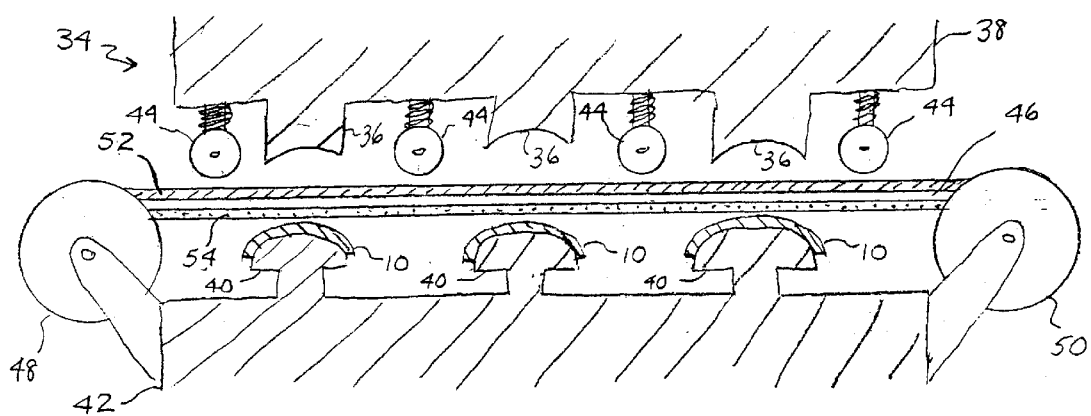
FIG. 5 is a cross-sectional view of the preferred embodiment of a die set used for forming the metallic artificial nail in accordance with the present invention in its open position.
Figure 6:
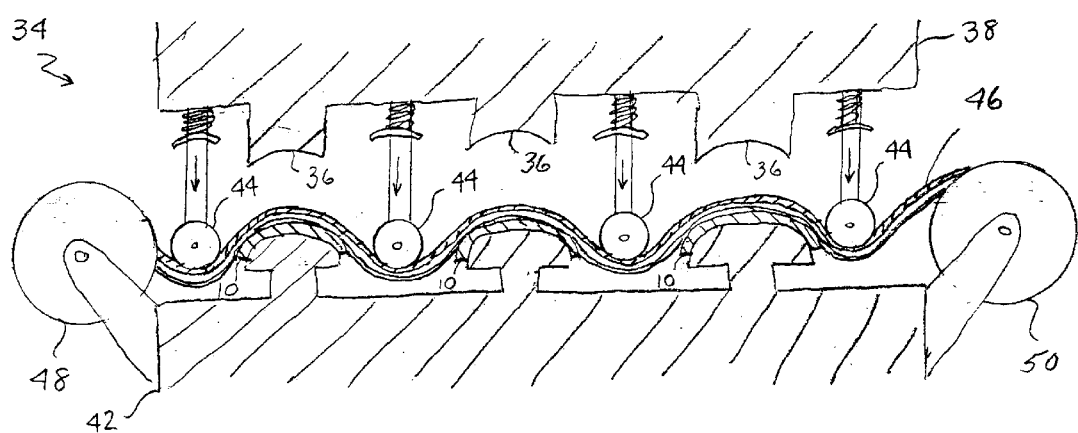
FIG. 6 is a cross-sectional view of the die set shown in FIG. 5 in its intermediate position.
Figure 7:
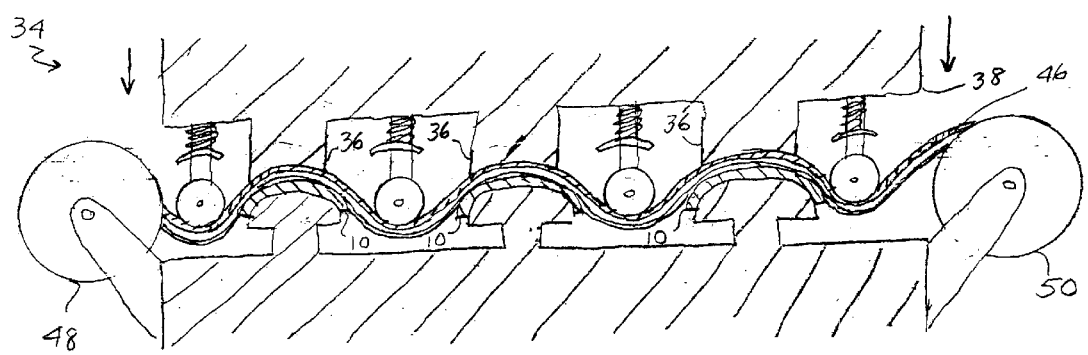
FIG. 7 is a cross-sectional view of the die set shown in FIGS. 5 and 6 in its closed position.

In operation, a nail body 10 is first positioned on the contoured surface of each die 40. The metallic substrate feed system positions metallic substrate material 46 over each nail body 10 so that the heat-activatable layer 54 faces the top surface of the nail body, as shown in FIG. 5. With everything in place, the stretching rollers 44 simultaneously traverse downward toward the nail bodies 10 and engage the metallic substrate 46. The stretching rollers 44 straddling each die 40 stretch the metallic substrate 46 over the contour of each nail body 10, as shown in FIG. 6. The heated top die shoe 38 is then brought downward so that the contoured surface of the top die shoe punches 36 bears upon the metallic substrate 46 and the nail body 10, as shown in FIG. 7. The heat-activatable layer 54 reacts to the heat supplied by the top die shoe 38 and bonds to the top surface of the nail body 10. Only the area of the metallic substrate 46 directly in contact with the heated top die shoe punches 36 will react to the heat and will be released from the backing layer 52. This leaves portions of the metallic substrate 46 between the heated punches intact on the backing layer 52. It is noted that by supplying the metallic substrate 46 on a releasable backing layer 52 and heating only the portion of the substrate to be bonded to the nail body, the top die shoe punches 36 do not require cutting edges, as described above. In other words, it is not necessary to cut the metallic substrate 46 because only the heated area of the substrate will be released from the backing layer 52 and bonded to the nail body 10.

Figure 8:
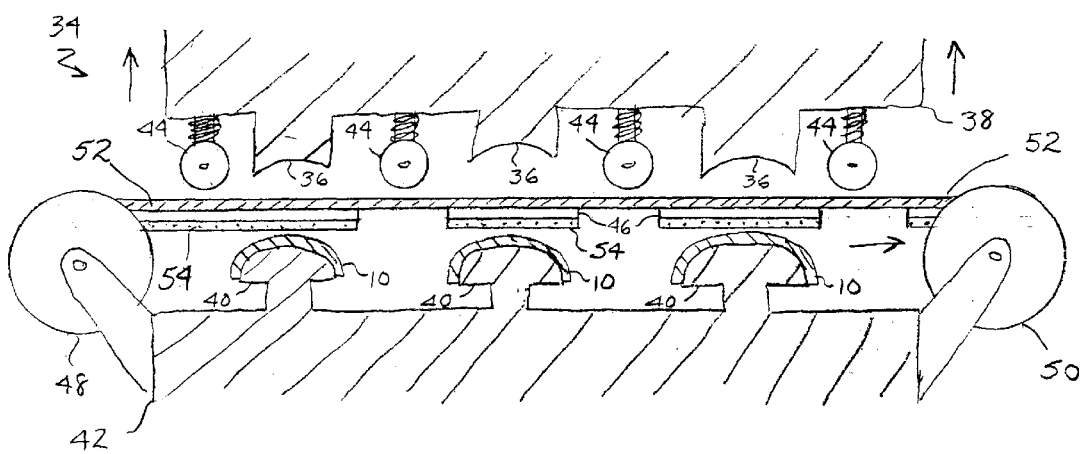
FIG. 8 is a cross-sectional view of the die set shown in FIGS. 5–7 returned to its open position.

Once bonding is complete, the top die shoe 38 is raised and the completed metallic artificial nails are removed from the bottom dies 40. New nail bodies 10 can then be placed on the bottom dies 40 and the metallic substrate feed system incrementally positions metallic substrate material above each nail body, as shown in FIG. 8. The process described above is repeated to produce another set of metallic artificial nails.

As a result of the process of the present invention, a metallic artificial nail having a desirable appearance is provided. The process for manufacturing the nail is simple, cost effective and does not require the messy separate application of adhesive or the smoothing or trimming of the metallic sheet material. The pre-applied metallic layer is durable, chip resistant and cosmetically appealing.

While there has been described what is presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A method for making a metallic artificial nail for attachment to a natural nail comprising the step of heat-stamping a metallic substrate having a heat-activatable layer to a surface of a contoured nail body whereby said metallic substrate is bonded to said nail body.

2. The method as defined in claim 1, wherein the step of heat-stamping includes the steps of:

placing said nail body in a heat-stamping press die set, said nail body being sized and shaped to be attachable to the top surface of a natural nail and having a top surface having a contour and a bottom surface having a contour;

placing said metallic substrate in said heat-stamping press die set such that said heat-activatable layer faces said top surface of said nail body;

closing said hot-stamping press die set so that said heat-activatable layer of said metallic substrate makes contact with said top surface of said nail body; and heating said heat-stamping press die set to cause said heat-activatable layer of said metallic substrate to bond to said top surface of said nail body.

3. The method as defined in claim 2, wherein said heat-stamping press die set includes a first contoured surface substantially corresponding to the contour of said bottom surface of said nail body for supporting said bottom surface of said nail body when said die set is closed.

4. The method as defined in claim 3, wherein said heat-stamping press die set includes a bottom die shoe having a die, said first contoured surface being provided on said die.

5. The method as defined in claim 3, wherein said heat-stamping press die set includes a second contoured surface substantially corresponding to the contour of said top surface of said nail body, said second contoured surface of said die set facing said top surface of said nail body when said die set is closed.

6. The method as defined in claim 5, wherein said heat-stamping press die set includes a cutting edge surrounding said second contoured surface, said cutting edge cutting said metallic substrate around the periphery of said nail body as said die set is closed.

7. The method as defined in claim 6, wherein the peripheral edges of said cut metallic substrate adhere to the peripheral edge of said nail body.

8. The method as defined in claim 6, wherein the peripheral edges of said cut metallic substrate are beveled during cutting.

9. The method as defined in claim 5, wherein said second contoured surface of said die set bears against said metallic substrate as said die set is closed causing said metallic substrate to conform to said top surface of said nail body.

10. The method as defined in claim 9, wherein said metallic substrate stretches as it conforms to said top surface of said nail body.

11. The method as defined in claim 5, wherein said heat-stamping press die set includes a top die shoe having a punch, said second contoured surface being provided on said punch.

12. The method as defined in claim 1, further comprising the step of coating said metallic substrate with a clear sealant.

13. The method as defined in claim 1, wherein said metallic substrate comprises a metal selected form the group consisting of aluminum, silver, copper and gold.

14. The method as defined in claim 1, wherein said metallic substrate is bonded over the entire top surface of said nail body.

15. The method as defined in claim 1, wherein said metallic substrate is bonded over only a portion of the top surface of said nail body.

16. The method as defined in claim 1, wherein said nail body is made from a transparent material.

17. The method as defined in claim 1, wherein said nail body includes a proximal end sized and shaped to substantially correspond to the full nail bed of the natural nail.

18. The method as defined in claim 1, wherein said nail body includes a proximal end sized and shaped to be attachable to only the distal end of the natural nail.

19. The method as defined in claim 1, further comprising the step of stretching said metallic substrate over said contoured nail body prior to said heat-stamping.

20. The die as defined in claim 1, further comprising stretching rollers positioned on opposite sides of punch for stretching said metallic substrate onto said contoured nail body prior to heat-stamping.

* * * * *